United States Patent [19]

Ohba et al.

[11] Patent Number: 5,500,148

[45] Date of Patent: Mar. 19, 1996

[54] SILICONE EMULSION COMPOSITION FOR SURFACE RELEASE TREATMENT

[75] Inventors: Toshio Ohba; Naomi Sato; Masahiko Ogawa; Morizo Nakazato, all of Gunma, Japan

[73] Assignee: Shin-Etsu Chemical Co., Ltd., Tokyo, Japan

[21] Appl. No.: 91,116

[22] Filed: Jul. 13, 1993

[30] Foreign Application Priority Data

Jul. 14, 1992 [JP] Japan .................................. 4-209599
Oct. 7, 1992 [JP] Japan .................................. 4-293898

[51] Int. Cl.$^6$ ............................ B01F 17/54; C08L 83/04; C08L 83/10

[52] U.S. Cl. ...................... 252/315.2; 524/502; 524/506; 524/588; 524/562

[58] Field of Search ............................ 252/302, 315.2; 524/502, 552, 377, 506, 588, 862; 427/387

[56] References Cited

U.S. PATENT DOCUMENTS

| | | | |
|---|---|---|---|
| 4,504,645 | 3/1985 | Melancon | 528/15 |
| 4,533,575 | 8/1985 | Melancon | 427/387 |
| 5,036,117 | 7/1991 | Chung et al. | 522/172 |
| 5,108,782 | 4/1992 | Reed | 427/54.1 |
| 5,108,791 | 4/1992 | Chung et al. | 427/208.8 |
| 5,125,998 | 6/1992 | Jones et al. | 156/273.3 |
| 5,229,212 | 7/1993 | Reed | 428/429 |

FOREIGN PATENT DOCUMENTS

| | | |
|---|---|---|
| 0426487 | 5/1991 | European Pat. Off. . |
| 0491598 | 6/1992 | European Pat. Off. . |

*Primary Examiner*—Shean C. Wu
*Attorney, Agent, or Firm*—Millen, White Zelano, & Branigan

[57] ABSTRACT

Proposed is an improved aqueous silicone emulsion composition for surface-release treatment comprising a vinyl-containing organopolysiloxane and an organohydrogenpolysiloxane emulsified is an aqueous medium with addition of a platinum compound as a catalyst for the hydrosilation reaction between the silicon-bonded vinyl groups and silicon-bonded hydrogen atoms. Different from conventional silicone emulsion compositions of this type having a pH value of around neutrality, the inventive silicone emulsion composition has a pH value not higher than 5 so that a quite unexpected advantage can be obtained that the stability of the emulsion composition in the curability and other properties after a long period of storage and against mechanical working can be greatly improved.

26 Claims, No Drawings

SILICONE EMULSION COMPOSITION FOR SURFACE RELEASE TREATMENT

BACKGROUND OF THE INVENTION

The present invention relates to a silicone emulsion composition for surface release treatment or, more particularly, to a silicone emulsion composition suitable for surface release treatment of various kinds of substrates having excellent stability relative to the pot life and shelf life along with good curability of the surface film formed therefrom even after intense mechanical working.

It is a well established technology that the surface of various substrates such as sheets of paper, plastics and the like coming into contact with a sticky substance is coated with a surface-release silicone composition with an object to prevent adhesive sticking therebetween. The surface-release silicone compositions currently under practical applications are mostly of the solution type by using a large volume of an organic solvent. A serious problem in the use of these surface-release silicone compositions is that the organic solvent not only causes pollution of the atmospheric air but also is undesirable in respect of the safety in the working environment and workers' health due to the inflammability and toxicity of the organic solvent because recovery of once vaporized solvents is almost impossible unless very expensive facilities are installed even by setting aside the problem of the expensiveness of organic solvents in general.

With an object to avoid the above mentioned problems due to the use of an organic solvent, silicone emulsion compositions for surface-release treatment without using any organic solvents have been proposed including those of the condensation reaction-curable type and the addition reaction-curable type. The silicone emulsion compositions of the condensation reaction-curable type are defective in the relatively short pot life so that they can be used in limited applications. On the other hand, those of the addition reaction-curable type are advantageous in respect of the relatively long pot life so that several different methods have been proposed for the preparation thereof. For example, Japanese Patent Publication 57-53143 proposes a method in which a mixture is prepared from a first aqueous emulsion comprising water, a vinyl-containing organopolysiloxane, a platinum compound as a catalyst and an emulsifying agent and a second aqueous emulsion comprising water, an organohydrogenpolysiloxane, a platinum compound as a catalyst and an emulsifying agent. Japanese Patent Kokai 54-52160 discloses a surface-release silicone emulsion composition prepared by the method of emulsion polymerization. Further, Japanese Patent Kokai 63-314275 teaches a method in which a vinyl-containing organopolysiloxane and an organohydrogenpolysiloxane are jointly emulsified in water by using a specific emulsifying agent and this emulsion is then admixed with an aqueous emulsion of a platinum compound as the catalyst.

The silicone emulsion composition prepared by the first of the above mentioned methods is not always quite satisfactory because the pot life and shelf life of the composition cannot be long enough as desired along with a rather poor curability. A problem in the last of the above mentioned methods is that an emulsifying agent having high purity is required and only limited emulsifying agents can be used therefor.

SUMMARY OF THE INVENTION

The present invention accordingly has an object to provide a novel silicone emulsion composition for surface-release treatment of various substrate materials free from the above described problems and disadvantages in the prior art compositions relative to the pot life, shelf life and curability without affecting the surface-releasing performance.

Thus, the silicone emulsion composition for surface-release treatment provided by the present invention comprises:

(a) an organopolysiloxane represented by the average unit formula $R^3_b SiO_{(4-b)/2}$, in which $R^3$ is an unsubstituted or substituted monovalent hydrocarbon group and the subscript b is a positive number not exceeding 3, and having a viscosity in the range from 100 to 100,000 centipoise at 25° C., of which each of the molecular chain ends is blocked with a triorganosiloxy group represented by the general formula $R^1_a R^2_{3-a} SiO—$, $R^1$ being an aliphatically unsaturated monovalent hydrocarbon group, $R^2$ being an unsubstituted or substituted monovalent hydrocarbon group free from aliphatic unsaturation and the subscript a being 1, 2 or 3;

(b) an organohydrogenpolysiloxane represented by the average unit formula $R^2_c H_d SiO_{(4-c-d)/2}$, in which $R^2$ has the same meaning as defined above and the subscripts c and d are each a positive number with the proviso that c+d does not exceed 3;

(c) an acid;

(d) a surface active agent;

(e) a platinum compound;

(f) water as an emulsifying medium of the other components; and, optionally, (g) an addition-reaction moderator, and has a value of pH in the range from 3 to 5.

In particular, it is preferable that the subscript a in the general formula representing the terminal group of the organopolysiloxane as the component (a) is 3 or, in other words, all of the organic groups bonded to the silicon atom at each of the molecular chain ends are aliphatically unsaturated monovalent hydrocarbon groups such as vinyl groups.

DETAILED DESCRIPTION OF THE PREFERRED EMBODIMENTS

As is described above, the silicone emulsion composition of the invention is an aqueous emulsion of the essential components (a) to (e) emulsified in water as the component (f). As compared with conventional silicone emulsion compositions for surface-release treatment, the inventive silicone emulsion composition is remarkably advantageous in respect of the pot life and shelf life without affecting the good curability of the addition-reaction curable silicone composition as well as the surface-releasing performance.

The organopolysiloxane as the component (a) is the principal silicone ingredient in the inventive silicone emulsion composition. Characteristically, each of the molecular chain ends of this organopolysiloxane is blocked with a triorganosiloxy group represented by the general formula $R^1_a R^2_{3-a} SiO—$, in which each of the symbols $R^1$ and $R^2$ and the subscript a has the meaning as defined above. Namely, the group denoted by $R^1$ is an aliphatically unsaturated monovalent hydrocarbon group including alkenyl and alkynyl groups such as vinyl, allyl, hexenyl and ethynyl groups or, preferably, vinyl group. The group denoted by $R^2$ is an unsubstituted or substituted monovalent hydrocarbon group free from aliphatic unsaturation including alkyl groups such as methyl, ethyl, propyl and butyl groups and aryl groups such as phenyl and tolyl groups as well as those substituted groups obtained by replacing a part or all of the hydrogen atoms in the above named hydrocarbon groups with halogen atoms, cyano groups and the like such as chloromethyl, 2-cyanoethyl and 3,3,3-trifluoropropyl groups. The subscript a is 1, 2 or 3 so that the silicon atom at each of the molecular chain ends has at least one aliphatically unsaturated monovalent hydrocarbon group bonded thereto. Examples of the terminal triorganosiloxy group include dimethyl vinyl siloxy group, diallyl methyl siloxy group, trivinyl siloxy group and the like, of which trivinyl siloxy group is preferred in respect of the good curability of the inventive silicone composition.

The organopolysiloxane as the component (a) is represented by the average unit formula $R^3{}_b SiO_{(4-b)/2}$, in which $R^3$ is an unsubstituted or substituted monovalent hydrocarbon group exemplified by those groups given above as the examples of the groups denoted by $R^1$ and $R^2$. The subscript b is a positive number not exceeding 3. It is preferable that at least 80% by moles of the groups denoted by $R^3$ in the organopolysiloxane are methyl groups because the surface-releasing effect of the substrate surface treated with the inventive composition against sticky substances can be enhanced thereby.

The molecular structure of the organopolysiloxane as the component (a) can be straightly linear or branched or can partially include a crosslinked structure provided that each of the molecular chain ends is blocked with the above defined terminal triorganosiloxy group having 1 to 3 aliphatically unsaturated groups. It is of course optional that the organopolysiloxane as the component (a) is a combination of two kinds or more of organopolysiloxane compounds having different molecular structures each satisfying the above mentioned requirements. As to the content of the aliphatically unsaturated hydrocarbon groups, it is essential that from 0.05 to 15% by moles or, preferably, from 0.2 to 2% by moles of the hydrocarbon groups bonded to the silicon atoms in the organopolysiloxane are unsaturated hydrocarbon groups. When the content of the unsaturated hydrocarbon groups is too low, the silicone emulsion composition is not suitable for practical use due to the unduly low curing velocity of the film formed from the composition while, when the content of the unsaturated hydrocarbon groups is too high, a decrease is caused in the surface releasability of the film formed from the composition.

As is mentioned above, the surface releasability of the film formed from the inventive silicone emulsion composition can be enhanced when each of the terminal triorganosiloxy groups has a plural number or, preferably, three of the unsaturated hydrocarbon groups. This effect is more remarkable when the overall content of the unsaturated hydrocarbon groups in the organopolysiloxane is low or, in other words, the unsaturated hydrocarbon groups are localized at the molecular chain ends.

It is essential that the organopolysiloxane as the component (a) has a viscosity in the range from 100 to 100,000 centipoise or, preferably, from 200 to 10,000 centipoise at 25° C. When the viscosity is too low, a problem would eventually be caused in that the distribution of the silicone constituent would be uneven on the substrate surface, especially, when the absorptivity of the substrate material to the emulsion composition is low as is the case with glassine paper. When the viscosity is too high, on the other hand, a difficulty is caused in the emulsification of the organopolysiloxane in an aqueous medium.

The organohydrogenpolysiloxane as the component (b) serves as a crosslinking agent of the above described organopolysiloxane as the component (a) and is represented by the average unit formula $R^2{}_c H_d SiO_{(4-c-d)/2}$, in which each symbol has the same meaning as defined above. Namely, $R^2$ is an unsubstituted or substituted monovalent hydrocarbon group exemplified by alkyl groups such as methyl, ethyl, propyl and butyl groups, aryl groups such as phenyl and tolyl groups, alkaryl groups such as ethylphenyl group and cycloalkyl groups such as cyclohexyl group as well as those substituted groups obtained by replacing a part or all of the hydrogen atoms in the above named hydrocarbon groups with halogen atoms, cyano groups and the like such as chloromethyl, 3,3,3-trifluoropropyl and 2-cyanoethyl groups. The subscripts c and d are each a positive number with the proviso that c+d does not exceed 3. The molecular structure of the organohydrogenpolysiloxane is not particularly limitative including straightly linear, branched and partly crosslinked ones. It is of course optional that the component (b) is a combination of two kinds or more of organohydrogenpolysiloxanes having different molecular structures.

It is preferable that the organohydrogenpolysiloxane as the component (b) has at least three hydrogen atoms directly bonded to the silicon atoms in a molecule. As to the content of the silicon-bonded hydrogen atoms therein, it is preferable that the content of the silicon-bonded hydrogen atoms is in the range from 0.1 to 95% by moles or, more preferably, from 30 to 80% by moles based on the total molar amount of the groups denoted by $R^2$ and the silicon-bonded hydrogen atoms. Though not particularly limitative, the organohydrogenpolysiloxane as the component (b) should have a viscosity in the range from 3 to 500 centistokes at 25° C.

The amount of the organohydrogenpolysiloxane as the component (b) in the inventive silicone emulsion composition should be sufficient to provide from 1 to 10 moles or, preferably, from 1.5 to 5.0 moles of the silicon-bonded hydrogen atoms per mole of the aliphatically unsaturated hydrocarbon groups or vinyl groups in the organopolysiloxane as the component (a).

The component (c) in the inventive silicone emulsion composition is an acid which can be an organic acid or an inorganic acid. This component serves to prevent a decrease in the curability of the film formed from the inventive emulsion composition when the emulsion composition is stored over a long period of time. Examples of suitable acids include acetic acid, oxalic acid, butyric acid, benzoic acid and the like as an organic acid and hydrochloric acid, phosphoric acid, nitric acid and the like as an inorganic acid. The amount of the acid as the component (c) in the inventive silicone emulsion composition should be sufficient to impart the emulsion composition with a value of pH not higher than 5 or, preferably, in the range from 5 to 3.

The component (d) is a surface active agent which serves as an emulsifying agent to emulsify the silicone components in the aqueous medium. The type of the surface active agent is not particularly limitative including non-ionic, artionic and cationic surface active agents. Examples of the non-ionic surface active agents include alkylaryl ethers of polyoxyalkylenes such as polyoxyethylene nonylphenyl ethers, polyoxyethylene octylphenyl ethers and the like, alkyl ethers of polyoxyalkylenes such as polyoxyethylene lauryl ethers, polyoxyethylene tridecyl ethers and the like, alkyl esters of polyoxyalkylenes such as polyoxyethylene oleate, polyoxyethylene laurate and the like, and so on. They can be used either singly or as a combination of two kinds or more according to need. It is preferable that the non-ionic surface active agent or a mixture of two kinds or more of non-ionic surface active agents has an HLB value in the range from 10 to 15.

The artionic surface active agents suitable as the component (d) include, for example, long-chain alkyl sulfate, long-chain alkyl sulfonates, sodium polyoxyethylene alkylphenyl ether sulfates and the like. The cationic surface active agents suitable as the component (d) include quaternary ammonium salts such as benzyl trimethyl ammonium chloride and the like. However, the anionic and cationic surface active agents are less preferable than the nonionic surface active agents in respect of the higher catalytic activity of the platinum-based compound as the component (e) described below. The amount of the surface active agent as the component (d) should be sufficient to fully emulsify the silicone components in the aqueous medium with stability and is usually in the range from 1 to 20 parts by weight or, preferably, from 2 to 15 parts by weight per 100 parts by weight of the component (a).

The component (e) is a platinum compound which serves as a catalyst to promote the addition reaction or the hydrosilation reaction between the unsaturated hydrocarbon groups in the component (a) and the silicon-bonded hydrogen atoms in the component (b). Platinum compounds suitable as the component (e) are well known in the art of silicones including chloroplatinic acid, alcohol solutions thereof, complexes thereof with aldehydes, olefins and vinyl-containing organopolysiloxanes and the like.

The amount of the platinum compound as the component (e) in the inventive silicone emulsion composition depends on the desired curing velocity of the surface film formed from the composition but it is usually in the range from 10 to 500 ppm by weight as platinum based on the amount of the component (a).

As to the compounding procedure of the platinum compound as the component (e) in the inventive emulsion composition, it is preferable that the components (a) to (d) are first emulsified in water, i.e. component (f), to give an aqueous emulsion to which the platinum compound is added immediately before use of the inventive silicone emulsion composition instead of emulsifying the components (a) to (e) altogether in water. In this regard, it is desirable that the platinum compound as the component (e) is in a form readily dispersible in an aqueous emulsion of the components (a) to (d) so that, when the platinum compound is insoluble in water as in the case of a complex of chloroplatinic acid with an olefin, it is preferable that the water-insoluble platinum compound is blended separately with a part of the surface active agent as the component (d) to give a mixture which is added to the aqueous emulsion of the components (a) to (c) and the remainder of the component (d) in order to improve the dispersibility of the water-insoluble platinum compound in an aqueous medium.

The component (g), which is optional in the inventive silicone emulsion composition, is a reaction moderator which serves to adequately control the velocity of the addition reaction or so-called hydrosilation reaction between the unsaturated hydrocarbon groups in the component (a) and the silicon-bonded hydrogen atoms in the component (b). Examples of the compounds suitable as the component (g) include various kinds of organic nitrogen compounds, organic phosphorus compounds and unsaturated organic compounds having an acetylenic triple bond in the molecule. The amount of the component (g), when added, in the inventive silicone emulsion composition is usually in the range from 0.01 to 3 parts by weight per 100 parts by weight of the organopolysiloxane as the component (a).

The silicone emulsion composition of the present invention for surface-release treatment can be prepared by emulsifying the components (a) to (d) each in a specified amount relative to the amount of water by using a suitable mixing machine such as homomixers, homogenizers and the like and the thus obtained aqueous emulsion is admixed with the platinum compound as the catalyst, i.e. the component (e), to complete the inventive silicone emulsion composition.

Alternatively, a silicone emulsion composition which is equivalent to that obtained by the above described method can be prepared by first preparing an aqueous emulsion of the component (a) by the emulsion polymerization of a mixture of organopolysiloxane oligomers into an organopolysiloxane equivalent to the component (a) and the thus obtained aqueous emulsion is blended with an aqueous emulsion of the component (b) as well as the other essential and optional components.

Thus, a cyclic organopolysiloxane oligomer represented by the general formula $-(SiR^3_2Si-O-)_m-$, in which $R^3$ has the same meaning as defined before and the subscript m is a positive integer of 3 to 10, and a linear organopolysiloxane oligomer represented by the general formula $R^1_aR^2_{3-a}Si-O-(SiR^3_2-O-)_n-SiR^1_aR^2_{3-a}$, in which $R^1$, $R^2$ and the subscript a each have the same meaning as defined before and the subscript n is zero or a positive integer not exceeding 40, are jointly emulsified in an aqueous medium using an artionic surface active agent and subjected to emulsion copolymerization in the presence of an acidic catalyst into an organopolysiloxane, which satisfies the various requirements for the organopolysiloxane as the component (a) described above, in the form of an aqueous emulsion as formed.

Examples of the above mentioned cyclic organopolysiloxane oligomer include, for example, octamethyl cyclotetrasiloxane, 1,3,5,7-tetramethyl-1,3,5,7-tetravinyl cyclotetrasiloxane and the like while examples of the linear organopolysiloxane oligomer include 1,1,3,3-tetramethyl-1,3-divinyl disiloxane, 1,3-dimethyl-1,1,3,3-tetravinyl disiloxane, hexavinyl disiloxane and the like. The molar proportion of the cyclic and linear organopolysiloxane oligomers to be jointly emulsified in an aqueous medium is selected depending on the desired degree of polymerization of the organopolysiloxane as the component (a) to be obtained by the emulsion copolymerization.

In the emulsification of these organopolysiloxane oligomers in water, the amount of the water is in the range from 40 to 2000 parts by weight and the amount of the anionic surface active agent is in the range from 0.1 to 20 parts by weight each per 100 parts by weight of the total amount of the cyclic and linear organopolysiloxane oligomers. The aqueous emulsion can be readily prepared by adding the organopolysiloxane oligomers and the surface active agent to water and vigorously agitating the mixture by using a homomixer, homogenizer and the like. The emulsion polymerization of the organopolysiloxane oligomers can readily proceed in this aqueous emulsion at a temperature of 5° to 90° C. in the presence of an acidic catalyst.

Since the emulsion polymerization requires presence of both of a surface active agent and an acidic catalyst, it is a preferable way to use an anionic surface active agent which is in the form of an acid. Examples of such an anionic surface active agent include alkyl sulfate esters, polyoxyethylene alkylphenyl sulfate esters, alkylbenzene sulfonic acids, alkylnaphthalene sulfonic acids and the like. The amount of such an anionic surface active agent is in the range from 0.1 to 20 parts by weight or, preferably, from 0.3 to 3 parts by weight per 100 parts by weight of the total amount of the organopolysiloxane oligomers. When the amount thereof is too small, no fully stable aqueous emulsion can be obtained to affect proceeding of the emulsion polymerization. When the amount thereof is too large, on the other hand, certain adverse influences are caused on the activity of the platinum catalyst. It is of course that the above mentioned specific anionic surface active agents are used either singly or as a combination of two kinds or more or in combination with a non-ionic surface active agent according to need.

When the emulsion polymerization has come to completion, the reaction can be terminated by neutralizing the acidic anionic surface active agent with an alkaline compound such as sodium carbonate, sodium hydrogencarbonate and the like having no or little adverse influences on the activity of the platinum catalyst so that the aqueous emulsion thus obtained has a pH of 3 to 7.

The aqueous emulsion of the organopolysiloxane as the component (a) prepared in the above described manner is then blended with a second aqueous emulsion of an organohydrogenpolysiloxane as the component (b) separately prepared by using a surface active agent which should be anionic or non-ionic. The amounts of the surface active agent and water to form an aqueous emulsion are in the ranges from 0.3 to 20 parts by weight and from 40 to 2000 parts by weight, respectively, per 100 parts by weight of the organohydrogenpolysiloxane. The anionic surface active agent is not particularly limitative and need not be an acid-form one. The non-ionic surface active agent can be exemplified by those given before as the examples of the non-ionic surface active agent to be used in the method of the co-emulsification of the components (a) and (b). It is preferable that the aqueous emulsion of the organohydrogenpolysiloxane is admixed with a small amount of an acid such as acetic acid and the like so as to have a pH value of 3 to 5 in order to ensure stability of the silicon-bonded hydrogen atoms in the organohydrogenpolysiloxane.

The mixing ratio of these two aqueous emulsions should be such that the amount of the organohydrogenpolysiloxane as the component (b) contained in the second aqueous emulsion is in the range from 0.5 to 30 parts by weight per 100 parts by weight of the organopolysiloxane as the component (a) contained in the first aqueous emulsion. In particular, the amount of the second aqueous emulsion of the organohydrogenpolysiloxane as the component (b) should be sufficient to provide from 1 to 10 moles of the silicon-bonded hydrogen atoms per mole of the aliphatically unsaturated hydrocarbon groups, e.g., vinyl groups, in the organopolysiloxane as the component (a) emulsified in the first aqueous emulsion. When the amount of the component (b) is too small, the curability of the film formed from the silicone emulsion composition would be poor while, when the amount thereof is too large, the surface releasability of the film formed from the emulsion composition by curing would be decreased.

The silicone emulsion composition of the present invention obtained in the above described manner can be further admixed with a water-soluble polymeric compound such as methyl cellulose, sodium carboxymethyl cellulose, polyvinyl alcohol and the like with an object to prevent infiltration of the emulsion composition into the substrate to which the emulsion composition is applied or to control the surface releasability of the film formed from the composition on the substrate surface.

It is further optional that the inventive silicone emulsion composition is admixed with small amounts of a levelling agent and an organic solvent as well as an organopolysiloxane free from both of the unsaturated hydrocarbon groups and silicon-bonded hydrogen atoms with an object to impart the film of the composition with slipperiness of the surface and to further enhance the surface releasability against sticky substances provided that no adverse influences are caused on the curability of the film formed from the emulsion composition.

The silicone emulsion composition of the present invention can be applied to the surface of various kinds of substrates to impart the substrate surface with surface-releasability against sticky substances. Examples of the substrates to which the inventive silicone emulsion composition is applicable include sheets of various grades of paper such as glassine paper, semi-glassine paper, parchment paper, polyethylene-laminated paper, polyvinyl alcohol-undercoated paper, art paper, kraft paper and the like as well as films of various kinds of plastic resins such as polyethylene, polypropylene, polystyrene, polyvinyl chloride, polyethylene terephthalate and the like.

The coating procedure of the substrate surface with the inventive silicone emulsion composition is conventional without particular limitations by using a coating machine such as roller coaters, gravure coaters, air knife coaters, wire doctor coaters, brush coaters and the like. The coating amount with the inventive silicone emulsion composition depends on the particularly intended application of the surface-treated release sheet but it is usually in the range from 0.1 to 5 g/m$^2$ calculated for the total amounts of the silicone constituents in the emulsion composition.

The substrate material coated with the inventive silicone emulsion composition is passed through an oven such as hot-air circulation oven and the like and heated there at a temperature of 80° to 200° C. for 5 seconds to 3 minutes so that the layer of the emulsion composition is dried to form a film which is cured into a surface-releasing coating layer. Curing of the dried film of the inventive composition can be effected also by the irradiation with infrared light or ultraviolet light. Combined use of a heating oven and actinic rays is effective in increasing the efficiency of curing.

In the following, the silicone emulsion composition of the present invention for surface-release treatment is described in more detail by way of examples and comparative examples, in which the term of "parts" always refers to "parts by weight". The silicone emulsion compositions prepared in the examples and comparative examples were subjected to the evaluation tests for the items given below by the procedures described there.

Curability

A sheet of glassine paper having a basis weight of 60 g/m$^2$ was coated with the silicone emulsion composition in a coating amount of about 1.0 g/m$^2$ calculated for the silicone ingredients in the emulsion. The thus coated sheet of paper was heated in a hot-air circulation oven at 180° C. for a varied length of time to effect curing of the film formed on the substrate surface and curing was assumed to be complete when the surface was rubbed with a finger tip without causing falling of the coating film nor causing dullness of the surface luster. The minimum length of the heating time in seconds to obtain complete curing was recorded as a measure of the curability. This curability test was undertaken for a silicone emulsion composition both after I day and after 60 days of storage at room temperature from preparation. Alternatively, the curability was tested after i hour from preparation or after 8 hours of mechanical working by passing through a gear pump.

Peeling Resistance

A sheet of the same glassine paper as used in the curability test was coated with the silicone emulsion composition and heated to completely cure the coating film in the same manner as in the curability test. The heating time was the minimum to obtain a completely cured coating film. A commercially available pressure-sensitive adhesive tape (kraft tape, a product by Nitto Denko Co.) was applied and bonded to the thus treated glassine paper and kept standing for 20 hours at 50° C. under a load of 20 g/cm$^2$ followed by seasoning for 1 hour at 25° C. Thereafter, the thus obtained laminated sample sheet was cut into strips of 5 cm width of which the adhesive tape was peeled off by pulling apart from the glassine paper in a 180 ° direction on a tensile testing machine at a pulling velocity of 30 cm/minute to record the force required for peeling of the adhesive tape in g/5 cm.

Adhesiveness Retention

A sheet of glassine paper was treated with the silicone emulsion composition in the same manner as in the test of peeling resistance described above and a polyester-based pressure-sensitive adhesive tape (Lumirror 31B, a product by Nitto Denko Co.) was applied and bonded to the thus treated surface of the glassine paper followed by a heat treatment at 70° C. for 20 hours. Thereafter, the pressure-sensitive adhesive tape was peeled off from the glassine paper sheet and attached and bonded to a well polished surface of a stainless steel plate from which it was peeled off to measure the force required for peeling by pulling in a 180° direction at a pulling velocity of 30 cm/minute. Separately, the same but fresh pressure-sensitive adhesive tape as used above was attached and bonded to a well polished surface of a stainless steel plate and peeled therefrom in the same manner as above to measure the force required for peeling of the tape. The ratio of the value of the first peeling force to the value of the second peeling force was calculated and recorded in percentage as the adhesiveness retention.

EXAMPLE 1

An oil-in-water type silicone emulsion composition, referred to as the emulsion I hereinbelow, was prepared by vigorously agitating a mixture consisting of 60 parts of a dimethyl polysiloxane terminated at each molecular chain end with a trivinyl siloxy group and having a viscosity of 1500 centipoise at 25° C., 2 parts of a methyl hydrogen polysiloxane having a viscosity of 50 centipoise at 25° C. and consisting of 70% by moles of the methyl hydrogen siloxane units and 30% by moles of the dimethyl siloxane units forming the main chain terminated at each end with a trimethyl siloxy group, 1 part of 3,3-dimethyl-3-trimethyl-siloxy propyne-1 as a reaction moderator, 0.05 part of acetic acid, 4.0 parts of a polyoxyethylene nonylphenyl ether as a non-ionic surface active agent (NS-210, a product by Nippon Oil & Fat Co.) and 33 parts of water by using a homogenizer to effect phase-inversion emulsification. The emulsion composition had a pH value of 4 and the average droplet diameter thereof was 0.3/µm.

Separately, a catalyst mixture was prepared by uniformly blending 1 part of a complex of chloroplatinic acid and a vinyl-containing organopolysiloxane containing 1% by weight of platinum with 1 part of a polyoxyethylene octylphenyl ether (OP-3, a product by Nippon Oil & Fat Co.) and 1 part of the same polyoxyethylene nonylphenyl ether as used above. This catalyst mixture was added to 100 parts of the above prepared emulsion I diluted with 500 parts of water to prepare a working emulsion having a pH value of 4.5, which was subjected to the tests of the curability, peeling resistance and adhesiveness retention in the procedures described above to give the results shown in Table 1 below. The curability was tested of the composition after 1 day or after 60 days of storage at room temperature.

COMPARATIVE EXAMPLE 1

The experimental procedure was substantially the same as in the above described Example 1 excepting omission of the acetic acid. The silicone emulsion before the addition of the platinum catalyst mixture had a pH value of 7.0. The results of the evaluation tests of the thus prepared silicone emulsion composition are shown also in Table 1.

EXAMPLE 2

An aqueous emulsion was prepared by first agitating a mixture consisting of 1000 parts of octamethyl cyclotetrasiloxane, 10.6 parts of hexavinyl disiloxane, 10 parts of dodecylbenzene sulfonic acid and 664 parts of water by using a homomixer followed by homogenization by passing the mixture through a homogenizer under a pressure of 316 kgf/cm$^2$.

This emulsion was heated at 60° C. for 8 hours followed by cooling to 20° C. and then admixed with a 10% by weight aqueous solution of solium carbonate to have a pH value of 4. The thus obtained silicone emulsion composition, referred to as the emulsion II hereinbelow, had an average droplet diameter of 0.2 µm.

Separately, another silicone emulsion, referred to as the emulsion III hereinbelow, having a pH of 4 and an average droplet diameter of 0.25 µm was prepared in a similar manner from 1000 parts of a methyl hydrogen polysiloxane having a viscosity of 50 centipoise at 25° C. and consisting of 70% by moles of methyl hydrogen siloxane units and 30% by moles of dimethyl siloxane units with trimethyl siloxy groups at the molecular chain ends, 80 parts of a polyoxyethylene nonylphenyl ether (NS-210, a product by Nippon Oil & Fat Co.), 587 parts of water and 1 part of acetic acid.

Further separately, a self-emulsifiable platinum catalyst mixture was prepared from 20 parts of a complex of chloroplatinic acid and a vinyl-containing organopolysiloxane containing 1% by weight of platinum and 20 parts of a polyoxyethylene octylphenyl ether (OP-3, a product by Nippon Oil & Fat Co.).

A curable silicone emulsion composition having a pH value of 4.5 was prepared by blending 950 parts of the emulsion II and 50 parts of the emulsion III prepared above with 5250 parts of water followed by further admixture of 40 parts of the platinum catalyst mixture. A sheet of glassine paper was coated with this silicone emulsion composition by using a wire bar coater to obtain a uniform coating layer without repellency in a coating amount of 1.0 g/m$^2$ as dried. The sheet coated with the silicone emulsion composition was subjected to the same evaluation tests as in Example 1 either after 1 hour of standing from the moment of addition of the platinum catalyst mixture or after 8 hours of working by circulation at a rate of 25 liters/minute using a gear pump (Model MD- 30R, manufactured by Iwaki Co.) to give the results shown in Table 2.

COMPARATIVE EXAMPLE 2

Another silicone emulsion composition having a pH value of 7 and an average droplet diameter of 0.3 µm was prepared in a similar manner to the above from 60 parts of a dimethyl polysiloxane having a viscosity of 1500 centipoise at 25° C. and terminated at each molecular chain end with a trivinyl siloxy group, 3 parts of the same methyl hydrogen polysiloxane as used in Example 2, 1 part of 3,3-dimethyl-3-trimethylsiloxy propyne-1 as a reaction moderator, 4.0 parts of a polyoxyethylene nonylphenyl ether (NS-210, supra) and 33 parts of water. This silicone emulsion was admixed with the same platinum catalyst mixture as used in Example 2 to give a curable silicone emulsion composition, which was subjected to the same evaluation tests as in Example 2 either after I hour from preparation or after 8 hours of working by passing through a gear pump to give the results shown in Table 2.

TABLE 1

|  | Days of storage | Curability, seconds | Peeling resistance, g/5 cm | Adhesiveness retention, % |
|---|---|---|---|---|
| Example 1 | 1 | 10 | 30 | 98 |
| Example 1 | 60 | 10 | 30 | 98 |
| Comparative Example 1 | 1 | 10 | 30 | 95 |
| Comparative Example 1 | 60 | 60 | 20 | 80 |

TABLE 2

|  | Mechanical working | Curability, seconds | Peeling resistance, g/5 cm | Adhesiveness retention, % |
|---|---|---|---|---|
| Example 2 | no | 10 | 30 | 100 |
| Example 2 | yes | 12 | 38 | 98 |
| Comparative Example 2 | no | 10 | 30 | 98 |
| Comparative Example 2 | yes | 30 | 20 | 80 |

What is claimed is:

1. An aqueous silicone emulsion composition for surface-release treatment comprising:

(a) an organopolysiloxane represented by the average unit formula $R_b^3SiO_{(4-b)/2}$, in which $R^3$ is an unsubstituted monovalent hydrocarbon group or a monovalent hydrocarbon group substituted by one or more cyano groups or one or more halogen atoms and subscript b is a positive number not exceeding 3, said organopolysiloxane having a viscosity of 100–100,000 centipoise at 25° C., and each molecular chain end of said organopolysiloxane is blocked with a triorganosiloxy group of general formula $R_a^1SiO$—, wherein $R^1$ is a vinyl group, and subscript a is 3;

(b) an organohydrogenpolysiloxane represented by average unit formula $R_c^2H_dSiO_{(4-c-d)/2}$, in which $R^2$ is an unsubstituted monovalent hydrocarbon group free from aliphatic unsaturation or a monovalent hydrocarbon group free from aliphatic unsaturation which is substituted by one or more cyano groups or one or more halogen atoms and subscripts c and d are each a positive number with the proviso that c+d does not exceed 3;

(c) an acid;

(d) a surface active agent;

(e) a platinum compound; and (f) water as an emulsifying medium of the other components, and which has a value of pH in the range from 5 to 3.

2. A silicone emulsion composition as claimed in claim 1, wherein acid component (c) is acetic acid.

3. A silicone emulsion composition as claimed in claim 1, wherein surface active agent component (d) is a non-ionic surface active agent.

4. A silicone emulsion composition as claimed in claim 1, further comprising:

(g) an addition-reaction moderator.

5. A silicone emulsion composition as claimed in claim 1, wherein the amount of organohydrogenpolysiloxane component (b) is sufficient to provide 1–10 moles of silicon-bonded hydrogen atoms per mole of aliphatically unsaturated monovalent hydrocarbon groups in organopolysiloxane component (a).

6. A silicone emulsion composition for surface-release treatment comprising, in admixture:

(A) a first silicone emulsion which is a product of an emulsion copolymerization of a cyclic diorganopolysiloxane oligomer represented by general formula $—(SiR_2^3Si—O—)_m—$, in which $R^3$ is an unsubstituted monovalent hydrocarbon group or a monovalent hydrocarbon group substituted by one or more cyano groups or one or more halogen atoms and subscript m is a positive integer of 3 to 10, and a linear organopolysiloxane oligomer represented by general formula $R_a^1R_{3-a}^2Si—)—(SiR_2^3—O—)_n—SiR_a^1R_{3-a}^2$, in which $R^1$ is an aliphatically unsaturated monovalent hydrocarbon group, $R^2$ is an unsubstituted monovalent hydrocarbon group free from aliphatic unsaturation or a monovalent hydrocarbon group free from aliphatic unsaturation substituted by one or more cyano groups or one or more halogen atoms, $R^3$ has the same meaning as defined above, subscript a is 1, 2 or 3, and subscript n is 0 or a positive integer not exceeding 40, as emulsified in an acidic aqueous medium with an anionic surface active agent;

(B) a second silicone emulsion which is an emulsion of an organohydrogenpolysiloxane emulsified in an aqueous medium with a non-ionic or anionic surface active agent; and (C) a platinum compound, wherein the admixture has a pH in the range from 3 to 5.

7. A composition according to claim 1, wherein $R^1$ is, in each case, alkenyl or alkynyl;

$R^2$ in organohydrogenpolysiloxane component (b), is, in each case, alkyl, aryl, alkaryl or cycloalkyl and is either unsubstituted or substituted by one or more cyano groups or one or more halogen atoms; and $R^3$ is, in each case, alkenyl, alkynyl, unsubstituted alkyl, alkyl substituted by one or more cyano groups or one or more halogen atoms, unsubstituted aryl, or aryl substituted by one or more cyano groups or one or more halogen atoms.

8. A composition according to claim 7, wherein $R^1$ is, in each case, vinyl, allyl, hexenyl or ethynyl;

$R^2$ in organohydrogenpolysiloxane component (b), is, in each case, methyl, ethyl, propyl, butyl, phenyl, tolyl, ethylphenyl, cyclohexyl, chloromethyl, 3,3,3-trifluoropropyl or 2-cyanoethyl;

$R^3$ is, in each case, vinyl, allyl, hexenyl, ethynyl, methyl, ethyl, propyl, butyl, phenyl, tolyl, chloromethyl, 2-cyanoethyl or 3,3,3-trifluoropropyl.

9. A composition according to claim 1, wherein at least 80 mole % of the $R^3$ groups are methyl groups.

10. A composition according to claim 8, wherein at least 80 mole % of the $R^3$ groups are methyl groups.

11. A composition according to claim 1, wherein in organopolysiloxane component (a), 0.05–15 mole % of the hydrocarbon groups bonded to silicon atoms are unsaturated hydrocarbon groups.

12. A composition according to claim 8, wherein in organopolysiloxane component (a), 0.05–15 mole % of the hydrocarbon groups bonded to silicon atoms are unsaturated hydrocarbon groups.

13. A composition according to claim 1, wherein in organohydrogenpolysiloxane component (b), the content of silicon-bonded hydrogen atoms is 0.1–95 mole %, based on the total amount of $R^2$ groups and silicon-bonded atoms.

14. A composition according to claim 1, wherein organohydrogenpolysiloxane component (b) has a viscosity of 3–500 centistokes at 25° C.

15. A composition according to claim 1, wherein
component (c) is acetic acid, oxalic acid, butyric acid, benzoic acid, hydrochloric acid, phosphoric acid or nitric acid;
component (d) is an alkylaryl ether of a polyoxyalkylene, an alkyl ether of a polyoxyalkylene or an alkyl ester of a polyoxyalkylene and the amount of component (d) is 1–20 parts by weight per 100 parts by weight of component (a); and
the amount of component (e) is 10–500 ppm by weight based on the amount of component (a).

16. A composition according to claim 10, wherein
component (c) is acetic acid, oxalic acid, butyric acid, benzoic acid, hydrochloric acid, phosphoric acid or nitric acid;
component (d) is an alkylaryl ether of a polyoxyalkylene, an alkyl ether of a polyoxyalkylene or an alkyl ester of a polyoxyalkylene and the amount of component (d) is 1–20 parts by weight per 100 parts by weight of component (a); and
the amount of component (e) is 10–500 ppm by weight based on the amount of component (a).

17. A composition according to claim 4, wherein the amount of component (g) is 0.01–3 parts by weight per 100 parts by weight of component (a).

18. A composition according to claim 6, wherein subscript a is 3.

19. A composition according to claim 6, wherein said acidic aqueous medium contains an acid catalyst and said anionic surface active agent.

20. A composition according to claim 6, wherein said acidic aqueous medium contains an acidic anionic surface active agent.

21. A composition according to claim 6, wherein
component (A) contains 40–2,000 parts by weight water per 100 parts by weight total amount of cyclic and linear organopolysiloxane oligomers and 0.1–20 parts by weight of anionic surface active agent per 100 parts by weight of total amount of cyclic and linear organopolysiloxane oligomers, and
component (B) contains 0.3–20 parts by weight of surface active agent per 100 parts by weight of organohydrogenpolysiloxane and 40–2,000 parts by weight of water per 100 parts by weight of organohydrogenpolysiloxane.

22. A composition according to claim 6, wherein said admixture contains 0.5–30 parts by weight of said organohydrogenpolysiloxane of component (B) per 100 parts by weight of said organopolysiloxane of component (A).

23. A coated substrate composition comprising:
a substrate having a surface and a silicone emulsion composition applied to said surface of said substrate,
wherein said substrate is glassine paper, semi-glassine paper, parchment paper, polyethylene-laminated paper, polyvinyl alcohol-undercoated paper, art paper, kraft paper, polyethylene film, polypropylene film, polystyrene film, polyvinyl chloride film or polyethylene terephthalate film, and
said silicone emulsion composition is a composition according to claim 1.

24. A coated substrate composition comprising:
a substrate having a surface and a silicone emulsion composition applied to said surface of said substrate,
wherein said substrate is glassine paper, semi-glassine paper, parchment paper, polyethylene-laminated paper, polyvinyl alcohol-undercoated paper, art paper, kraft paper, polyethylene film, polypropylene film, polystyrene film, polyvinyl chloride film or polyethylene terephthalate film, and
said silicone emulsion composition is a composition according to claim 6.

25. A coated substrate composition according to claim 23, wherein the amount of said silicone emulsion composition applied to said substrate is 0.1–5 g/m².

26. A coated substrate composition according to claim 24, wherein the amount of said silicone emulsion composition applied to said substrate is 0.1–5 g/m².

* * * * *